(12) United States Patent
Sorenson et al.

(10) Patent No.: US 8,297,447 B2
(45) Date of Patent: Oct. 30, 2012

(54) DUAL SIDE CLEANING AND TRAVERSING SCREEN FILTRATION SYSTEM

(75) Inventors: David Sorenson, Visalia, CA (US); Bruce Adams, Fillmore, CA (US)

(73) Assignee: Fruit Growers Supply Company, Sherman Oaks, CA (US)

( * ) Notice: Subject to any disclaimer, the term of this patent is extended or adjusted under 35 U.S.C. 154(b) by 487 days.

(21) Appl. No.: 12/609,388

(22) Filed: Oct. 30, 2009

(65) Prior Publication Data

US 2010/0108620 A1 May 6, 2010

Related U.S. Application Data

(60) Provisional application No. 61/109,626, filed on Oct. 30, 2008.

(51) Int. Cl.
*B01D 29/62* (2006.01)
*B01D 29/01* (2006.01)
*B01D 33/44* (2006.01)
*B01D 29/68* (2006.01)

(52) U.S. Cl. .......................... 210/411; 210/413; 134/172

(58) Field of Classification Search .................. None
See application file for complete search history.

(56) References Cited

U.S. PATENT DOCUMENTS

| | | | | |
|---|---|---|---|---|
| 1,390,268 A * | 9/1921 | Beckett | ............................ | 134/74 |
| 1,452,844 A * | 4/1923 | Ogburn | ....................... | 134/104.1 |
| 1,708,721 A * | 4/1929 | Evans | ............................ | 134/83 |
| 1,822,276 A * | 9/1931 | Dunkley | ....................... | 209/724 |
| 1,824,814 A * | 9/1931 | Frine | ............................ | 134/65 |
| 1,964,275 A * | 6/1934 | Secondo | ........................ | 15/3.15 |
| 2,024,344 A * | 12/1935 | Eberts et al. | .................. | 209/173 |
| 2,316,159 A * | 4/1943 | Evett | ............................ | 134/63 |
| 2,787,277 A * | 4/1957 | Barry | ............................ | 134/61 |
| 2,940,458 A * | 6/1960 | Speckman | ....................... | 134/63 |
| 3,169,706 A * | 2/1965 | Ross | ............................ | 239/752 |
| 3,262,460 A * | 7/1966 | Huddle et al. | .................. | 134/72 |
| 3,471,026 A * | 10/1969 | Riker | ............................ | 210/327 |
| 4,063,565 A * | 12/1977 | Edwards et al. | ........... | 134/104.3 |
| 4,261,831 A * | 4/1981 | Linsenmeyer | ................ | 210/391 |
| 4,437,982 A * | 3/1984 | Wasson | ............................ | 209/5 |
| RE31,792 E * | 1/1985 | Colomer | ....................... | 134/181 |
| 4,639,315 A * | 1/1987 | Fuchs et al. | ................. | 210/333.1 |
| 4,646,769 A * | 3/1987 | O'Brien et al. | ............... | 134/199 |
| 4,709,713 A * | 12/1987 | Kuhl | ............................ | 134/72 |
| 4,777,972 A * | 10/1988 | Adam | ............................ | 134/172 |
| 4,844,106 A * | 7/1989 | Hunter et al. | .................. | 134/73 |
| 4,859,335 A * | 8/1989 | Whyte | ............................ | 210/393 |
| 5,008,010 A * | 4/1991 | Langner | ....................... | 210/232 |
| 5,124,029 A * | 6/1992 | Fjallstrom et al. | ............ | 209/250 |
| 5,228,467 A * | 7/1993 | Gilliam et al. | ............. | 134/100.1 |
| 5,257,739 A * | 11/1993 | Pascaru | ........................ | 239/266 |
| 5,419,349 A * | 5/1995 | Swain | ............................ | 134/72 |
| 5,425,876 A * | 6/1995 | Rector | ........................ | 210/354 |
| 5,560,831 A * | 10/1996 | Bladen et al. | ................. | 210/704 |
| 5,575,913 A * | 11/1996 | Sharkey | ........................ | 210/409 |

(Continued)

*Primary Examiner* — Robert James Popovics
(74) *Attorney, Agent, or Firm* — Sughrue Mion, PLLC

(57) ABSTRACT

A dual-side cleaning traversing screen filtration system which generally comprises a main trough water containment housing, a traversing manifold having a multitude of top and bottom disposed spray heads, flexible plumbing, a substantially planar, rectangular supported screen which is disposed over, and spans the opening of, the main trough water containment housing which, in the preferred embodiment, has a rectangular box like shape, with the combined assemblage functioning as a filter to separate unwanted debris from the water that passes through the screen into the slightly inclined main trough water containment housing where it can be continually removed and re-used.

18 Claims, 7 Drawing Sheets

U.S. PATENT DOCUMENTS

| | | | |
|---|---|---|---|
| 5,660,196 A * | 8/1997 | Bein | 134/129 |
| 5,779,887 A * | 7/1998 | Rector et al. | 210/159 |
| 5,968,372 A * | 10/1999 | Martensson et al. | 210/741 |
| 6,079,427 A * | 6/2000 | Perry, Jr. | 134/104.4 |
| 6,269,823 B1 * | 8/2001 | Lincoln | 134/131 |
| 6,354,442 B1 * | 3/2002 | Obst | 210/353 |
| 6,461,507 B1 * | 10/2002 | Ishigaki et al. | 210/333.01 |
| 6,672,462 B2 * | 1/2004 | Sharkey | 210/409 |
| 6,833,077 B2 * | 12/2004 | Flanagan | 210/772 |
| 6,899,807 B2 * | 5/2005 | Cummings | 210/97 |
| 6,926,839 B2 * | 8/2005 | Sharkey | 210/767 |
| 6,976,592 B1 * | 12/2005 | Svehaug | 210/411 |
| 7,097,046 B2 * | 8/2006 | Calabrese | 210/391 |
| 7,431,165 B1 * | 10/2008 | Svehaug | 210/411 |
| 7,807,050 B2 * | 10/2010 | Baumann et al. | 210/107 |
| 7,833,424 B1 * | 11/2010 | Baumann et al. | 210/791 |
| 8,002,994 B2 * | 8/2011 | Engdahl et al. | 210/768 |
| 2010/0108620 A1 * | 5/2010 | Sorenson et al. | 210/791 |

* cited by examiner

DUAL SIDE CLEANING AND TRAVERSING SCREEN FILTRATION SYSTEM

BACKGROUND OF THE INVENTION

1. Field of the Invention

This invention relates generally to the field of water filtration systems. Moreover, it pertains specifically to a filtration system which separates unwanted debris from high volumes of water.

2. Background

Conventional water filtration systems include a screen that separates unwanted debris from water flowing therethrough. A problem that occurs in these systems is that the debris gets trapped in the screen, blocking or impeding the flow of water therethrough. In such case, the system must be shut down to be cleaned of the trapped debris.

One solution to this problem has been to provide high pressure spray nozzles on an upstream side, i.e., above, of the screen. However, in systems including these upstream spray nozzles, debris gets lodged in the holes in the screen, blocking the flow of water.

An alternative solution to removing debris from the screen, has been to provide a bar below the screen that aerates the screen from a downstream side. Although such an arrangement improves the prevention of debris being lodged in the screen, it requires that a large amount of water be sprayed upstream to adequately remove any trapped debris.

Accordingly, there remains a need for an improved system that can filter larger volumes of water through a screen and adequately remove accumulated debris from the screen without requiring that the system be shut down and without using large amounts of water.

SUMMARY OF THE INVENTION

A principal objective of the present invention is to provide a dual-side cleaning and traversing screen filtration system that will overcome the deficiencies of the prior art devices.

An objective of the present invention is to provide a dual-side cleaning and traversing screen filtration system that filters a higher volume of water than conventional screen filters.

Another objective of the present invention is to provide a dual-side cleaning and traversing screen filtration system that cleans the screen more thoroughly than conventional screen filter cleaning systems.

Another objective of the present invention is to provide a dual-side cleaning and traversing screen filtration system that removes debris from the screen filter more thoroughly than conventional screen filter cleaning systems.

Another objective of the present invention is to provide a dual-side cleaning and traversing screen filtration system which has a unique traversing spray mechanism, having top and bottom nozzles, that sprays and cleans both sides of the screen at the same time.

Another objective of the present invention is to provide a dual-side cleaning and traversing screen filtration system that utilizes a slightly inclined screen and trough, allowing the water continually to be reused.

Another objective of the present invention is to provide a dual-side cleaning and traversing screen filtration system that does not require a back wash mode on the screen filter.

Another objective of the present invention is to provide a dual-side cleaning and traversing screen filtration system that is universally functional.

Another objective of the present invention is to provide a filtration system for filtering fluid flowing therethrough that includes a main trough having a path along which the fluid flows; a screen disposed in the main trough across the path of the fluid; and a traversing sprayer disposed adjacent the screen and movable along a length of the screen. The traversing sprayer includes an upstream spray nozzle disposed on one side of the screen positioned to spray in a direction substantially towards the screen and a downstream spray nozzle disposed on the other side of the screen positioned to spray in a direction substantially towards the screen.

Another objective of the present invention is to provide a method of removing debris from a screen used to filter fluid including flowing the fluid through the screen; spraying fluid onto the screen from nozzles at an upstream side of the screen relative to the flow of the fluid; spraying fluid onto the screen from nozzles at a downstream side of the screen relative to the flow of the fluid at the same time as spraying the fluid from the upstream side; and traversing the nozzles on the upstream side and the downstream side of the screen simultaneously along a length of the screen.

It is intended that any other advantages and objectives of the present invention that become apparent or obvious from the detailed description or illustrations contained herein are within the scope of the present invention.

BRIEF DESCRIPTION OF THE DRAWINGS

The following drawings further describe by illustration the advantages and objectives of the present invention.

PREFERRED EMBODIMENT OF THE INVENTION

It is a purpose of the present invention to provide a dual-side cleaning and traversing screen filtration system that is advantageous over conventional screen filtration systems.

Figure 1:
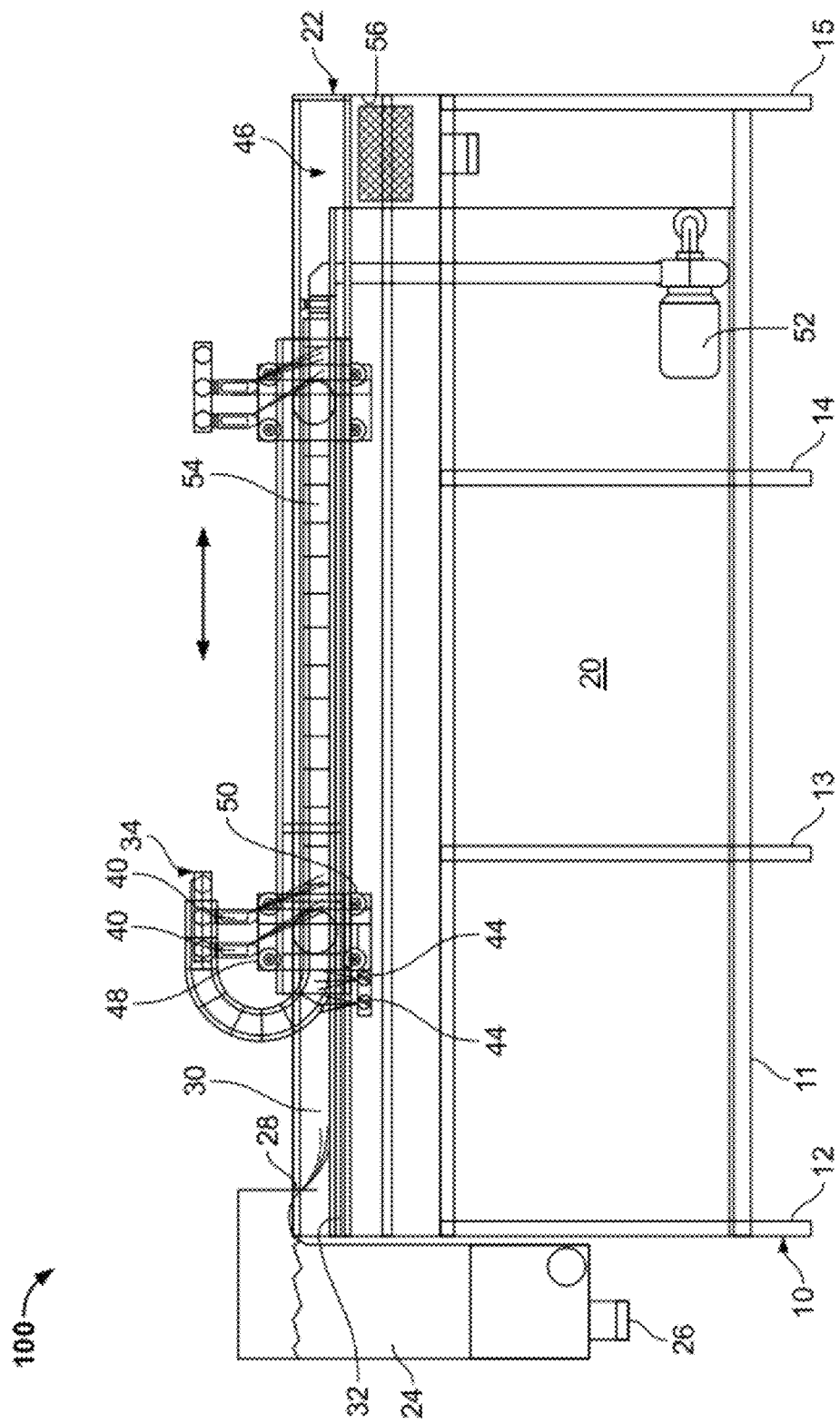
FIG. 1 is a side elevation view of a dual-side cleaning and traversing screen filtration system according to an embodiment of the present invention.
Figure 2:
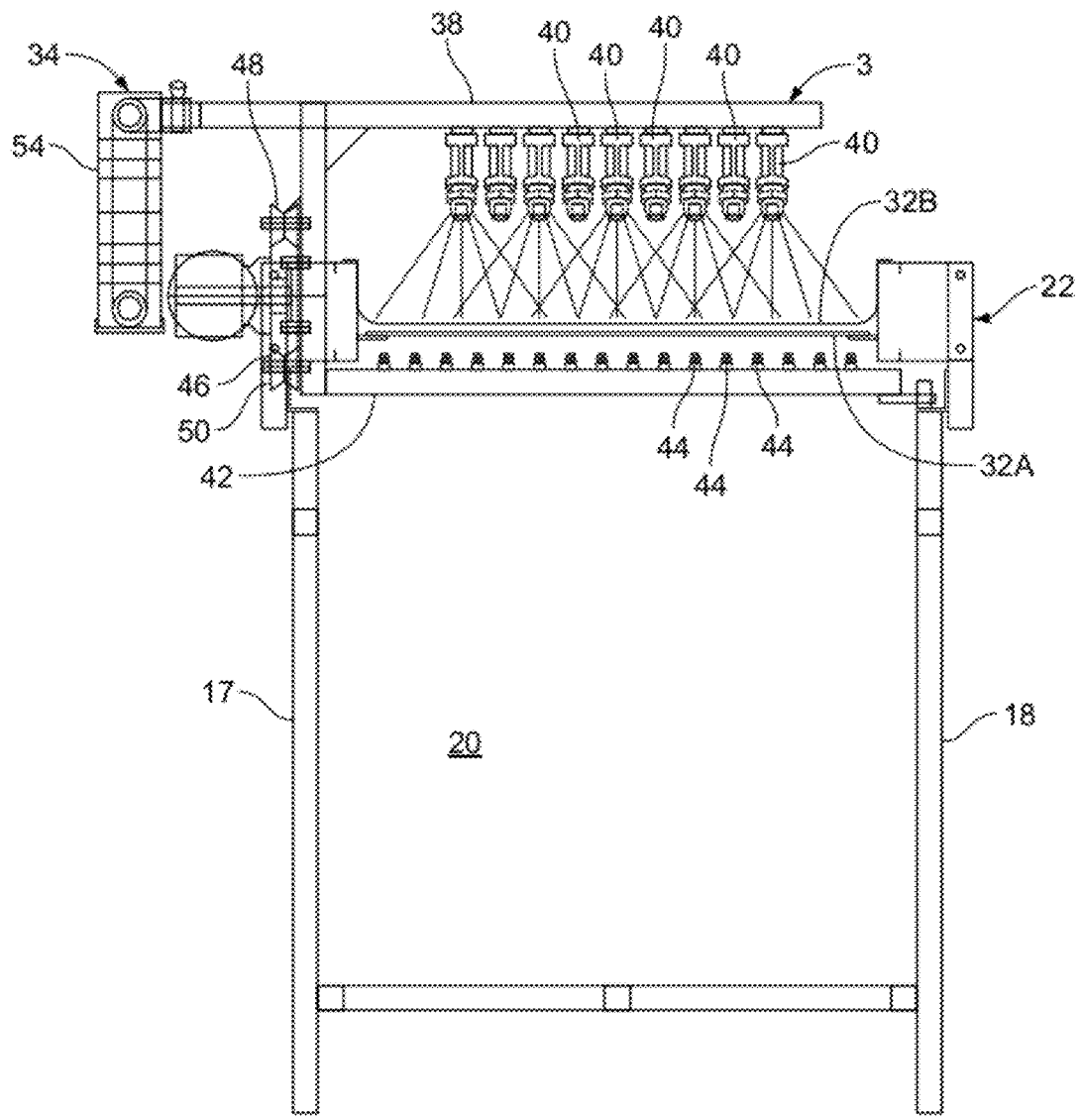
FIG. 2 is a front elevation view of a dual-side cleaning and traversing screen filtration system of FIG. 1.
Figure 3:
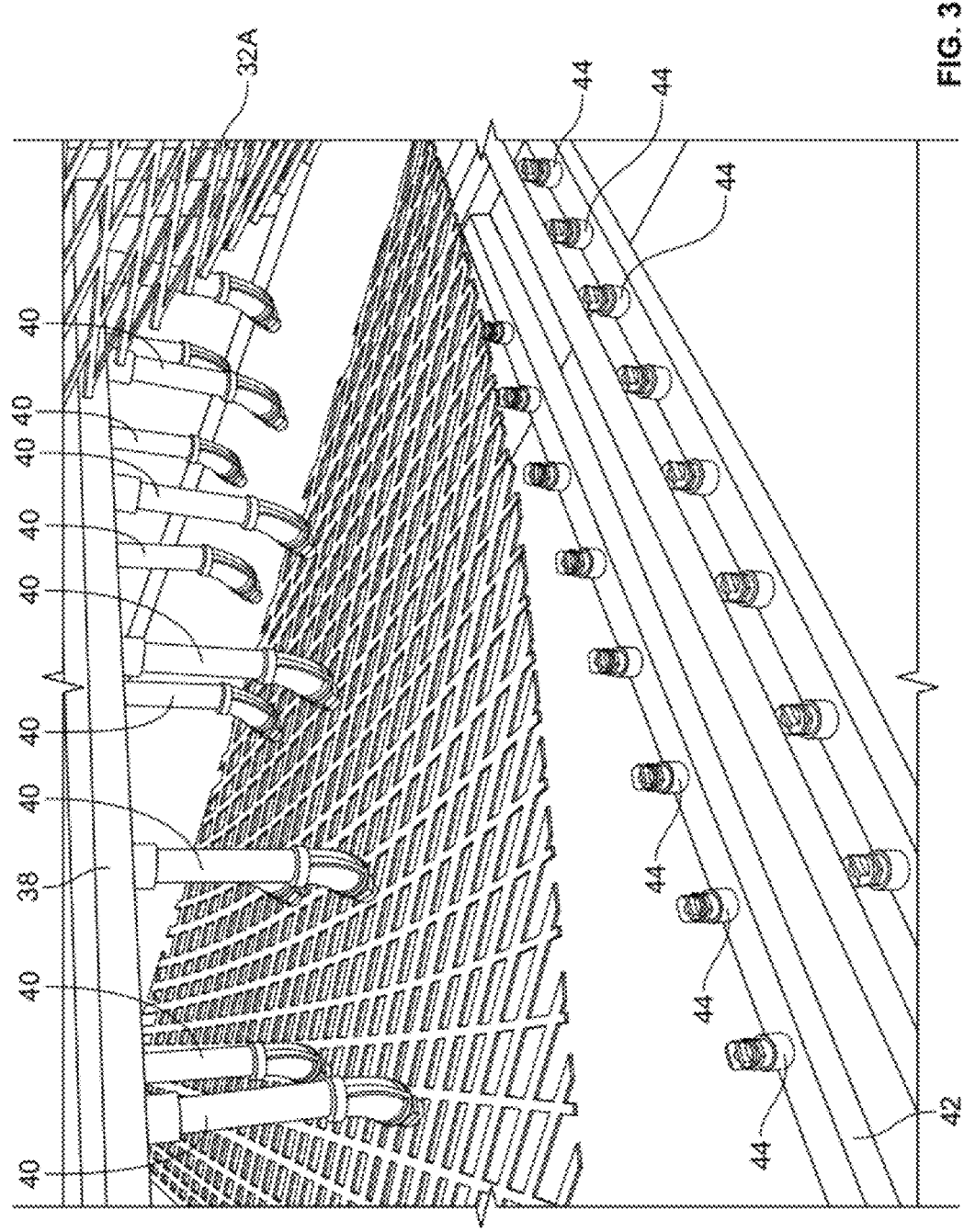
FIG. 3 is a perspective view of an embodiment of the nozzles used in a device embodying the invention, with upper and lower spray bars revealed and with the mesh screen removed but support screen partially present and lifted upwardly.
Figure 4:
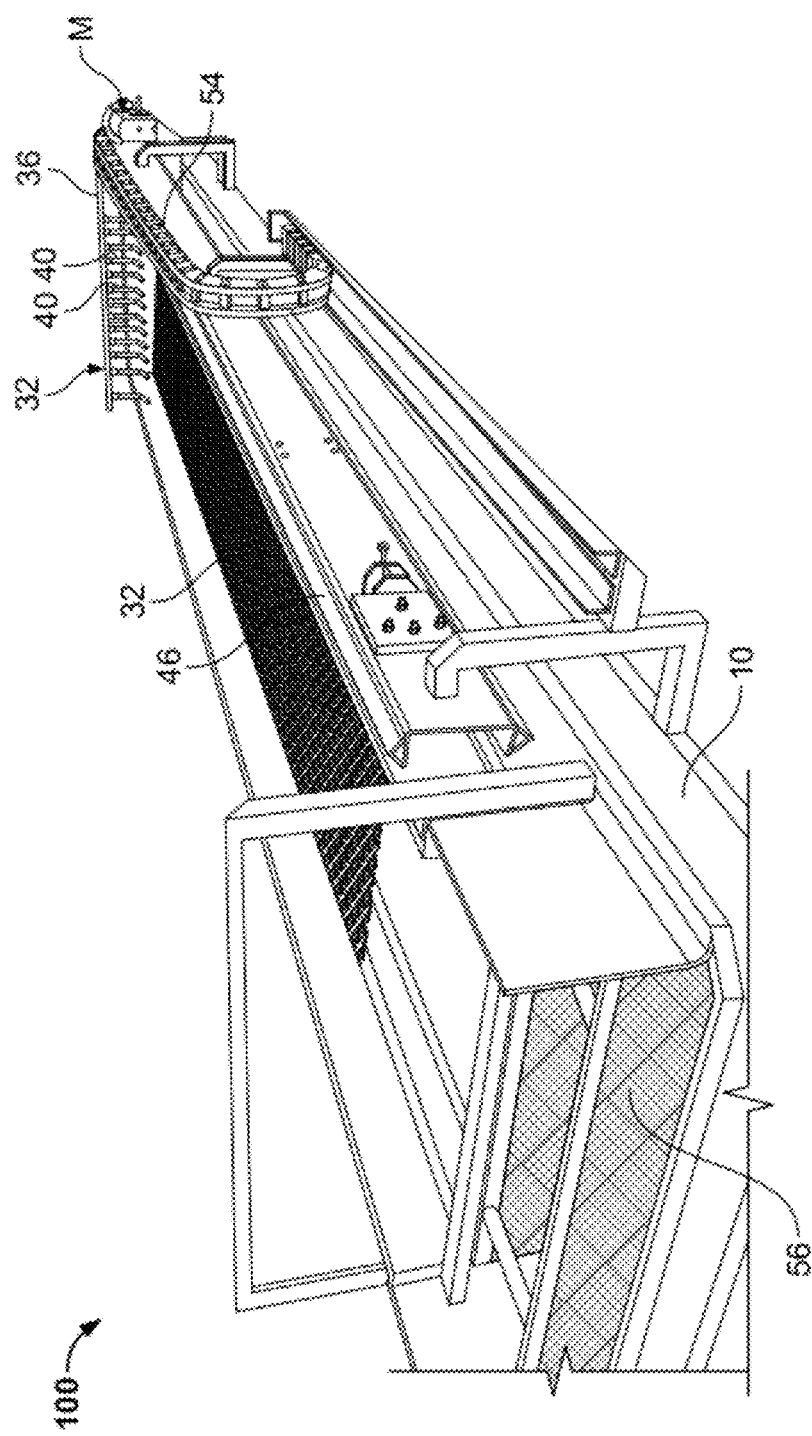
FIG. 4 is another perspective view of a dual-side cleaning and traversing screen filtration system according to an embodiment of the present invention, illustrating the device in the assembled state.
Figure 5:
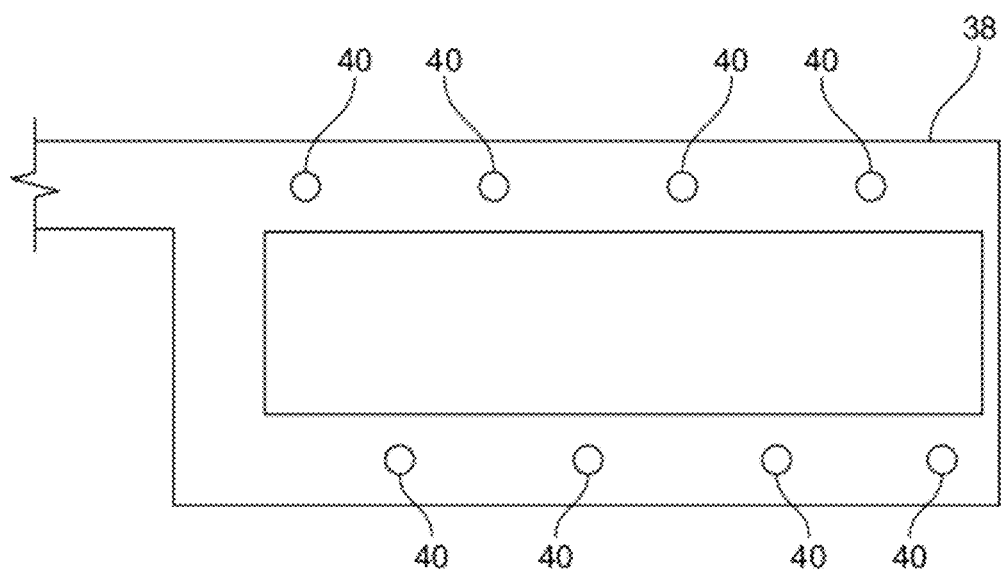
FIG. 5 is a top schematic view of an exemplary embodiment of the top manifold and the upper nozzles illustrating two rows of nozzles alternately arranged.

With reference to FIGS. 1 and 2, the filtration system 100 generally comprises a frame 10 having a bottom 11, vertical supports 12-15 and side walls 17, 18 that define a filtered fluid holding tank 20 for holding filtered water. A top horizontal structure defines a bottom of a main trough 22 that is disposed above the filtered water holding tank.

Attached to one side of the frame 10 is a buffer tank 24 having an inflow inlet 26 through which is provided a supply of effluent that is to be cleaned. As the effluent under pressure fills the tank 24, it flows over a lip 28 and through an outlet and enters one end of the trough 22, flowing first onto a screen 32 that is disposed approximately horizontally, or preferably at a slight angle to the horizontal, along the entire length of the trough 22. The screen 32 may comprise a support screen 32A and a fine mesh screen or cloth 32B. As effluent flows over the screen 32 from one end of the trough 22 to the other, water filtered by the screen 32 drops through the mesh in the screen 32 into the trough 22 while debris accumulates on the top and bottom surfaces of the screen 32. Such debris tends to clog the openings in the screen 32, and in time will prevent passage of water through the screen 32 into the trough 22, thereby reducing substantially the efficiency of the screen filter unit 100. Water that passes through the screen 32 is directed by the trough 22 into a filtered water holding tank 20, defined by the horizontal and vertical structural components of the unit 11-18, for collection.

In order to clean the screen 32 of accumulated debris, a traversing sprayer 34 is provided for movement along the entire length of the screen 32. FIG. 1 illustrates the traversing sprayer 34 that is movable in a horizontal direction. The traversing sprayer 34 comprises a manifold 36 that includes a top spray manifold 38 having downward directing nozzles 40 that provide a plurality of streams of cleansing water onto the top surface of the screen 32. The manifold 36 of the traversing sprayer 34 also has a bottom manifold 42 with a plurality of bottom nozzles 44 that direct jets of water upward through the openings of the screen 32, thereby loosing debris that may have been wedged in the openings of the screen 32. The bottom nozzles 44 merely loosen the debris while the top nozzles 40 clear the debris from the screen 32, moving the debris across the screen 32.

The traversing sprayer 34 rides on a track 46 and is coupled to the track 46 for movement by wheels 48 and 50. The traversing sprayer 34 is coupled to a web that is rotated around pulleys by an electric motor M (e.g., ½ hp) that is that controllably driven so that the traversing sprayer 34 moves back and forth along the length of the screen 32. Water for ejection through the nozzles 40 and 44 is provided to the traversing sprayer 34 by a pump 52 that is coupled to the traversing sprayer 30 by a flexible hose 54. The hose 54 is connected to the top and bottom spray manifolds 38, 42.

As debris is pushed up through the bottom of the screen and simultaneously removed across the top of the screen 32, it flows towards a trash collection receptacle 56 where is it collected for removal by an operator.

The screen 32 is substantially planar and rectangularly shaped and is disposed over and spans the opening of the main water trough containment housing which, in the preferred embodiment, has a rectangular box-like shape. The screen 32 and trough 22 may be inclined at a slight angle toward the trash collection receptacle 56 to allow the water to run over the screen 32 to the end of the trough 22 and to be continually removed and reused.

Each manifold 38, 42 is provided with sufficient spray heads 40, 44 to cover the entire width of the screen 32 with high pressure water sprays. The manifolds 38, 42 traverse back and forth along the screen 32 with high pressure water sprays and are attached to flexible plumbing 54 that supplies the correct water pressure for the cleaning spray from a recirculation pump.

Figure 6:
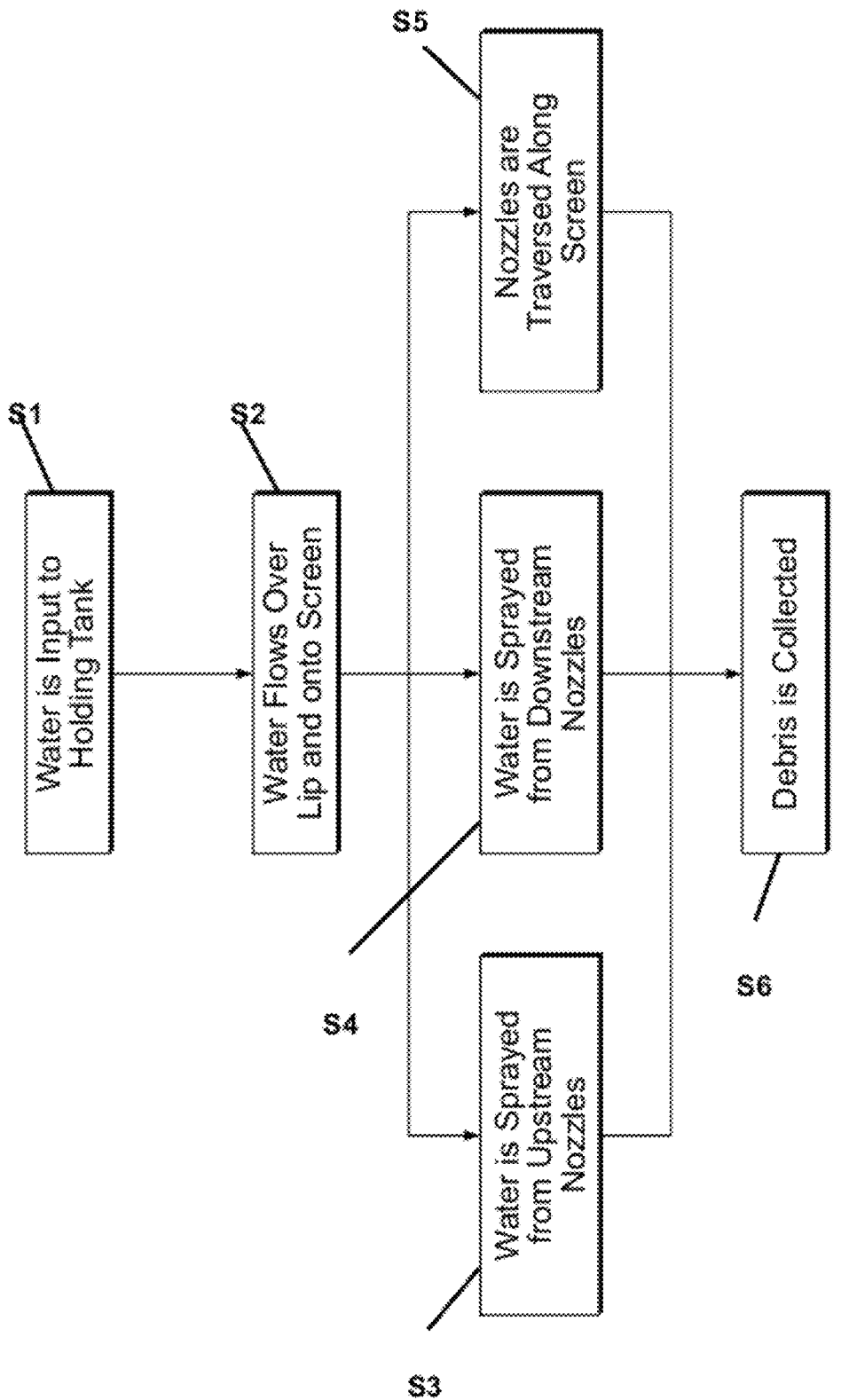
FIG. 6 is a flow diagram illustrating a method according to an embodiment of the present invention.

In operation, as best shown in FIG. 6, water flows into the holding tank 24 (step S1) until the water flows over the lip 28 and onto the screen 32 (step S2). As the water filters through the screen 32, debris collects in the screen 32. Water is then sprayed from the nozzles 40 from the upstream side (step S3), and sprayed from the nozzles 44 from a downstream side (step S4) onto the screen 32 as the nozzles 40, 44 are traversed (step S5). Once the debris is moved along the screen as a consequence of the water sprayed by the moving nozzles 40, 44, the debris is collected (step S6) in the collector 56.

The present invention is intended to filter unwanted debris from high volumes of liquid which, in the preferred embodiment, is water. However, the apparatus may be used to filter and employ a variety of other liquids, as would be understood by those skilled in the art.

One unique feature of the invention is that the traversing sprays clean both sides of the screen mesh at the same time, and require no back flush mode on the screen filter. The openings within the screen can be of a multiple of sizes to meet this specific foreign object filtering requirements of each application. The traversing spray is aggressively applied at a pressure in a range of approximately 40 psi, although other pressures can be used depending on the application. This keeps the mesh aerated and cleaned topically, removing all solids in the wire mesh or cloth itself, allowing the water to easily percolate, or filter, through the mesh even when the water carries high amounts of debris.

COMPARATIVE EXAMPLE

The following are two examples of filtering systems. System 1 includes only a single set of nozzles, the data of which was taken November of 2007 through October of 2008. System 2 is an exemplary embodiment of the present invention, the data of which was taken at the same location at that of System 1 from December of 2008 through May of 2009. The water readings were meter readings taken from the local water district. The two systems were run approximately the same amount of time per day to clean approximately the same amount of fruit per day.

Table 1 illustrates the water usage per day for System 1. Table 2 illustrates the water usage per day and the percentage reduction as compared to the previous listed reading, for System 2. The water usage per day was calculated by dividing the amount of gallons used since the previous reading by the number of days since the previous reading.

TABLE 1

Water Usage for System 1 (comparative example)

| Reading Date | No. Days | Reading of Total Water Usage (Gallons) | Water Usage Per day (Gallons) |
|---|---|---|---|
| Nov. 1, 2007 |  | 144330 |  |
| Dec. 4, 2007 | 33 | 115880 | 3512 |
| Dec. 31, 2007 | 27 | 113760 | 4213 |
| Jan. 30, 2008 | 30 | 136270 | 4542 |
| Mar. 5, 2008 | 33 | 192830 | 5843 |
| Apr. 2, 2008 | 28 | 193200 | 6900 |
| Apr. 30, 2008 | 28 | 189600 | 6771 |
| May 29, 2008 | 29 | 160110 | 5521 |
| Jun. 30, 2008 | 32 | 183650 | 5739 |
| Jul. 29, 2008 | 29 | 78690 | 2713 |
| Aug. 27, 2008 | 29 | 201120 | 6935 |
| Sep. 29, 2008 | 33 | 30640 | 928 |
| Oct. 29, 2008 | 31 | 67480 | 2177 |

TABLE 2

Water Usage for System 2 (example of present invention)

| Reading Date | No. Days | Reading of Total Water Usage (Gallons) | Water Usage Per Day (Gallons) | % Reduction in Water Usage |
|---|---|---|---|---|
| Dec. 1, 2009 | 32 | 114960 | 3593 | -2 |
| Dec. 31, 2008 | 30 | 86230 | 2874 | 32 |
| Jan. 29, 2009 | 29 | 71670 | 2471 | 46 |
| Mar. 2, 2009 | 35 | 96090 | 2745 | 53 |
| Mar. 30, 2009 | 28 | 101200 | 3614 | 48 |
| Apr. 30, 2009 | 31 | 109160 | 3521 | 48 |
| May 28, 2009 | 28 | 109980 | 3928 | 29 |
| Average Percent reduction | | | | 36 |
| Gallons saved in 7 month period | | | | 489,210 |

In Table 2, the percentage Reduction in water usage was calculated by comparing the water usage per day in Table 2 with the water usage per day for the previous year, i.e., the water usage per day listed in Table 1 for System 1. The average percentage reduction in water usage with System 2 over using System 1 is 36%. In the seven month period of the data gathering, 489,210 gallons of water were saved as compared to the water usage of the same months of the previous year, during which System 1 was used.

Figure 7:
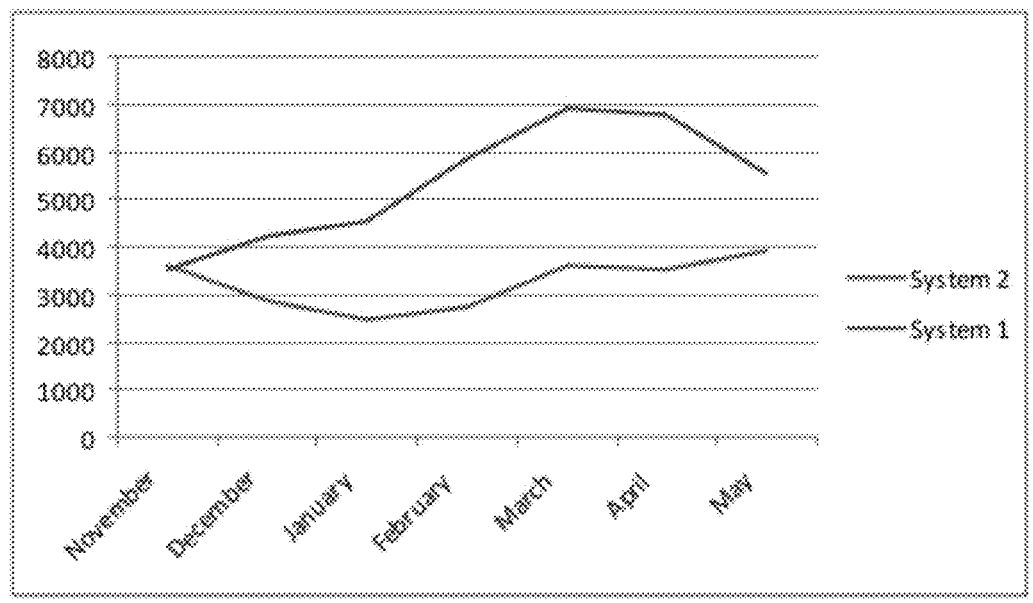
FIG. 7 is a chart illustrating the water usage for a conventional system and for a system of the present invention.

The chart shown in FIG. 7 compares the two systems by superimposing the water usage per day for System 1 and System 2 for the months of November through May. The vertical axis illustrates the daily water usage in gallons. System 1 is shown in the chart vertically above System 2. The chart clearly and accurately depicts the decrease in water usage of System 2 over System 1.

Described herein is a unique screen filter design that simultaneously cleans the top and bottom surfaces of the screen mesh. Adding a second movable spray bar underneath the screen mesh allows far superior elimination of solids in the mesh (wire cloth) resulting in significantly improved filtration and water savings. This filter will typically save 30-75% of the fresh water normally used in all other current technologies in similar applications. All currently existing screen mesh filters clean one side of the screen only. This inevitably leaves some sediment or solids still occluded in the mesh.

Additional water savings of 30-75% can be obtained because no backwash water is required for this design. Backwashing is required for most other screen filter designs, requiring large quantities of fresh water. The present invention uses its own filtered water for cleaning the screen surfaces. All other known technologies use fresh water for cleaning filter surfaces. Furthermore the processed water can be used as reclaimed for cleaning of the filtration surface.

While the foregoing has described the general physical aspects of the invention and is to serve as an aide to better understanding the intended use and application of the invention, one skilled in the art would understand that the present invention is not limited to the detailed construction, fabrication, material or application of use described and illustrated herein. Other variations of fabrication, use or application are within the scope of the invention as alternative embodiments.

What is claimed is:

1. A filtration system for filtering fluid flowing therethrough comprising:
   a frame;
   a main trough substantially horizontally mounted on said frame, and having a path along which the fluid flows;
   a screen disposed in said substantially horizontally mounted trough across the path of the fluid;
   a traversing sprayer disposed adjacent the screen and movable along a length of the screen; and
   a movement mechanism so constructed and arranged so as to linearly move said traversing sprayer along the length of said screen;
   wherein the traversing sprayer includes a U-shaped manifold having a plurality of upstream spray nozzles mounted on an upper leg disposed on one side of the screen positioned to spray in a direction substantially towards the screen and a plurality of downstream spray nozzles mounted on a lower leg disposed on the other side of the screen positioned to spray in a direction substantially towards the screen.

2. The system according to claim 1, further comprising a fluid holding tank disposed below the main trough and below the screen for holding the fluid that has passed through the screen.

3. The system according to claim 2, further comprising a recirculation pump to supply fluid from the fluid holding tank to the spray nozzles.

4. The system according to claim 1, wherein said movement mechanism comprises a track disposed along the main trough and along which the traversing sprayer moves.

5. The system according to claim 1, further comprising a pump that supplies fluid to the upstream spray nozzles and the downstream spray nozzles, and a flexible hose connecting the pump to the upstream spray nozzles and to the downstream spray nozzles.

6. The system according to claim 1, wherein the screen is disposed at an angle relative to the frame.

7. The system according to claim 1, wherein the upstream spray nozzles are positioned to spray in a direction slightly angled relative to the screen.

8. The system according to claim 1, wherein the screen is disposed at an angle relative to the main trough.

9. The system according to claim 1, further comprising a buffer tank disposed adjacent to and in fluid communication with the main trough at a position upstream of the screen, whereby fluid flows from the buffer tank into the main trough to be filtered.

10. The system according to claim 9, wherein the traversing sprayer is movable toward and away from the buffer tank.

11. The system according to claim 9, wherein the buffer tank includes an inlet through which fluid is supply to the tank, and an outlet disposed above the inlet and open to the main trough.

12. The system according to claim 9, further comprising a debris collector disposed on a side of the main trough opposite to the buffer tank.

13. The system according to claim 12, wherein the upstream spray nozzles are angled toward the debris collector.

14. The system according to claim 1, wherein each spray nozzle of the traversing sprayer is capable of spraying at least 7 gallons of fluid per minute.

15. The system according to claim 1, wherein the upstream spray nozzles and the downstream spray nozzles are each arranged in a plurality of rows extending in a direction traverse to a direction along which the traversing sprayer is movable.

16. The system according to claim 1, wherein a length of the trough along which the traversing sprayer is movable is at least approximately 10 feet.

17. The system according to claim 1, wherein a width of the trough is at least approximately 3 feet.

18. The system according to claim 1, wherein said movement mechanism comprises a traversing motor to move said traversing sprayer.

* * * * *